Figures 1, 2, 3:
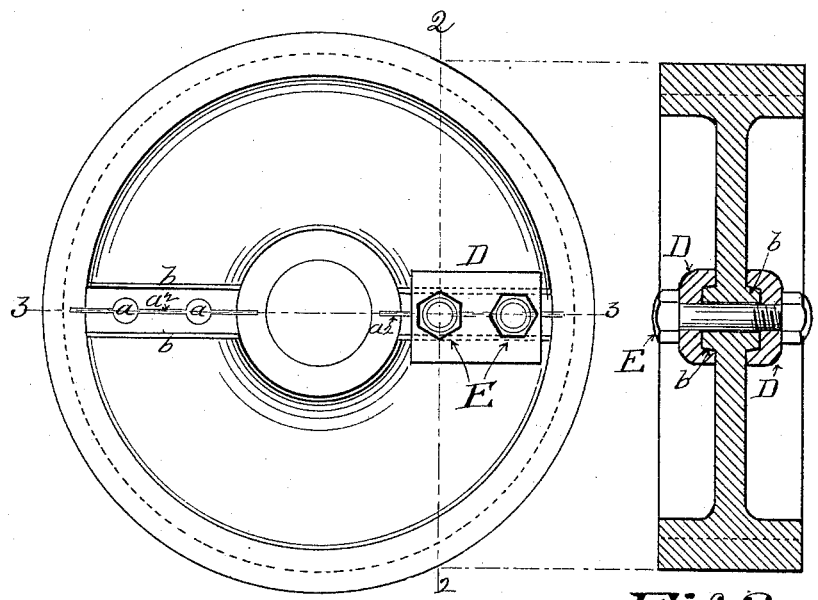

(No Model.)

J. SHERMAN.
MEANS FOR FASTENING PULLEYS OR GEARS.

No. 469,350.　　　　　　　　Patented Feb. 23, 1892.

Witness,
Louis Smith
E. Jay Pinney

Inventor;
John Sherman.
By Geo. W. Tibbitts Atty.

UNITED STATES PATENT OFFICE.

JOHN SHERMAN, OF CLEVELAND, OHIO, ASSIGNOR OF ONE-HALF TO LOUIS SMITH, OF SAME PLACE.

MEANS FOR FASTENING PULLEYS OR GEARS.

SPECIFICATION forming part of Letters Patent No. 469,350, dated February 23, 1892.

Application filed July 18, 1891. Serial No. 399,920. (No model.)

*To all whom it may concern:*

Be it known that I, JOHN SHERMAN, a citizen of the United States, and a resident of Cleveland, in the county of Cuyahoga and State of Ohio, have invented certain new and useful Improvements in Means for Fastening Split Pulleys or Gears, of which the following is a specification.

This invention relates to gear-wheels or pulleys that are made in two parts to enable them to be clamped on an axle or shaft; and it consists in the novel construction and combinations, as hereinafter described, and pointed out in the claim.
In the accompanying drawings, Figure 1 is a side view of wheel and fastener. Fig. 2 is a section on line 2 2 of Fig. 1. Fig. 3 is a section on line 3 3 of Fig. 1.

In casting this wheel I provide a core in the mold, which will make the holes $a$ $a$ for the bolts through the cross-ribs $b$ $b$ and also make narrow slots $a^2$ through said ribs. This leaves but a narrow connection $c$ $c$ in the rim and hub, (seen in Fig. 3,) uniting the two halves.
The dotted line in the rim shows the depth the gear-teeth are to be cut. The sides of the said ribs are slightly tapering, as seen in Fig. 2. When the casting has been finished, it is broken apart to separate the two halves, which enables them to be put upon a shaft in position.

D D are cap-pieces fitting over the ribs and are perforated in line with the aforesaid holes $a$ $a$, and are used for clamping the two halves of the wheel together by means of bolts E E. One of the said clamp-plates is tapped, so that the bolts screw into it for binding the two parts of the wheel together, and the nuts $n$ serve as jam-nuts.

The advantage of this construction, instead of bolting directly through the flanges, as is commonly done, is that it renders the work of applying the wheel to axles in close and difficult places much more convenient and easy to perform, and the nuts are easily got at to turn in securing or adjusting the wheel. This means of fastening the divided wheel is applicable to pulleys or wheels of all kinds.

Having described my invention, I claim—

The combination, in a two-part wheel or pulley having cross-ribs $b$ $b$, each provided with half-holes in the joining faces of said ribs, of perforated cap-pieces D and bolts E for clamping the parts together, substantially as and for the purpose specified.

JOHN SHERMAN.

Witnesses:
GEO. W. TIBBITTS,
LOUIS SMITH.